(12) United States Patent
Scheben

(10) Patent No.: US 12,528,694 B2
(45) Date of Patent: Jan. 20, 2026

(54) MICROELECTROMECHANICAL SYSTEM AND METHOD FOR MANUFACTURING A MICROELECTROMECHANICAL SYSTEM

(71) Applicant: Robert Bosch GmbH, Stuttgart (DE)

(72) Inventor: Rolf Scheben, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 337 days.

(21) Appl. No.: 17/395,679

(22) Filed: Aug. 6, 2021

(65) Prior Publication Data

US 2022/0048759 A1    Feb. 17, 2022

(30) Foreign Application Priority Data

Aug. 11, 2020    (DE) .......................... 102020210135.3

(51) Int. Cl.
*B81B 3/00*    (2006.01)
*B81C 1/00*    (2006.01)

(52) U.S. Cl.
CPC .......... *B81B 3/0021* (2013.01); *B81C 1/0015* (2013.01); *B81B 2201/0235* (2013.01); *B81C 2201/014* (2013.01)

(58) Field of Classification Search
CPC .......... B81B 3/0021; B81B 2201/0235; B81B 3/0013; B81B 2201/0242; B81B 2203/0118; B81B 7/02; B81B 2203/04; B81C 1/0015; B81C 2201/014; B81C 1/00166; G01P 3/44; G01P 15/125; G01P 2015/0862

See application file for complete search history.

(56) References Cited

U.S. PATENT DOCUMENTS

2009/0293616 A1    12/2009    Lin et al.
2016/0031701 A1*   2/2016    Schmid ............... B81C 1/00373
                                               428/189

FOREIGN PATENT DOCUMENTS

| DE | 102010039240 A1 * | 2/2012 | ............ G01P 15/125 |
| DE | 102012208032 A1 | 11/2013 | |
| DE | 102015103311 A1 | 9/2015 | |
| DE | 102018217841 A1 | 4/2020 | |
| EP | 0244581 A1 | 11/1987 | |
| EP | 0773443 A1 | 5/1997 | |

OTHER PUBLICATIONS

Machine translation of DE102010039240A1 (Year: 2012).*

* cited by examiner

*Primary Examiner* — Steven B Gauthier
*Assistant Examiner* — Sun Mi Kim King
(74) *Attorney, Agent, or Firm* — Norton Rose Fulbright US LLP

(57) ABSTRACT

A microelectromechanical system, including a substrate having a major plane of extension. The microelectromechanical system includes a mass structure. The mass structure is formed to be movable relative to the substrate in a vertical direction, perpendicularly to the major plane of extension. The mass structure includes an electrode structure. The substrate includes a counter-electrode structure. The electrode structure and the counter-electrode structure are coupled capacitively. The mass structure has a deformation in a resting state of the microelectromechanical system. The electrode structure and/or the counter-electrode structure are formed as a function of the deformation of the mass structure.

7 Claims, 6 Drawing Sheets ial system, with the aid of which a tendency of a mass structure of the microelectromechanical system to stick may be reduced in an advantageous manner.

MICROELECTROMECHANICAL SYSTEM AND METHOD FOR MANUFACTURING A MICROELECTROMECHANICAL SYSTEM

CROSS REFERENCE

The present application claims the benefit under 35 U.S.C. § 119 of German Patent Application No. DE 102020210135.3 filed on Aug. 11, 2020, which is expressly incorporated herein by reference in its entirety.

BACKGROUND INFORMATION

The present invention starts out from a microelectromechanical system according to the definition of the species in claim 1.

Microelectromechanical systems (MEMS) are widely available in the related art, for example, as inertial sensors for measuring accelerations and/or rates of rotation. Such sensors are mass-produced for various applications in the automotive and consumer-goods sectors.

For example, acceleration sensors are available, which have a detection direction perpendicular to the wafer plane (z-direction), and in which rocker-arm structures are used. The sensor principle of these rocker arms is based on a spring-mass system, in which in the simplest case, a movable seismic mass forms a plate-type capacitor with two counter-electrodes located on the substrate. The seismic mass is joined to the substrate by at least one, but, for reasons of symmetry, usually two, torsion springs. If the parts of the mass structure on the two sides of the torsion spring are of different size, then, in response to the effect of an acceleration in the z-direction, the mass structure will rotate relative to the torsion spring in the form of an axis of rotation, which generates a rocker-arm motion. In this case, the spacing of the electrodes becomes smaller on the side having the larger mass and greater on the other side. This produces a change in capacitance, which is a measure of the acting acceleration. Such accleration sensors are described, for example, in European Patent Nos. EP 0 244 581 A1 and EP 0 773 443 B1.

However, a disadvantage of such conventional MEMS is that in response to a large deflection, and in response to applied electrical voltages, the mass structure may have an increased tendency to stick.

SUMMARY

An object of the present invention is to provide a microelectromechanical system, with the aid of which a tendency of a mass structure of the microelectromechanical system to stick may be reduced in an advantageous manner.

A microelectromechanical system of an example embodiment of the present invention may have the advantage over the related art, that deformation already present in the resting state of the microelectromechanical system may be taken into account advantageously in the shaping of the electrode structure and/or the counter-electrode structure. This may allow the electrode structure and/or the counter-electrode structure to be shaped in such a manner, that a tendency to stick may be reduced in view of the deformation, even in the case of impingement of the sensor. Thus, out-of-plane electrodes patterned specifically in accordance with the present invention may be implemented.

If, instead, typically conventional electrode shapes (for example, simple rectangular shapes, circular shapes, or shapes including circular segments), which are not adapted to the deformation of the mass structure in the resting state, were to be used, then the gap between the electrode structure and the counter-electrode structure in these deformed regions would possibly be particularly small in the case of impingement of the sensor, which, in response to an applied electrical voltage (for example, during operation of the application-specific integrated circuit (ASIC)), would result in an increased tendency to stick. Such disadvantages may be overcome by the present invention.

According to an example embodiment of the present invention, in the shaping of the electrode structure and/or the counter-electrode structure, it is advantageously possible to take into account that the distance between the substrate and the mass structure in the resting state is already not constant, but may vary locally due to local instances of deformation/bending. According to an example embodiment of the present invention, the electrode structure and/or the counter-electrode structure may be designed, for example, advantageously, in such a manner, that the distance between the mass structure and the substrate in local regions, in which the distance in the resting state is less than in other regions due to the instances of deformation, is not reduced further in these local regions by the presence of the electrode structure and/or the counter-electrode structure.

Advantageous embodiments and refinements of the present invention may be derived from the description wherein and the figures.

Since, according to one specific embodiment of the present invention, the deformation of the mass structure in the resting state of the microelectromechanical system includes, in particular, locally varying predeflection of the mass structure relative to the substrate, and/or the deformation of the mass structure includes a deviation of a shape of the mass structure from a shape of the mass structure strived for during the manufacturing of the microelectromechanical system, and/or the deformation of the mass structure is caused by mechanical stresses, where the mechanical stresses are caused, in particular, by the manufacturing of the microelectromechanical system, it is advantageously possible to take into account the instances of bending and/or predeflection of the mass structure relative to the substrate, which may be produced, in particular, by mechanical stress in the course of manufacturing the MEMS. For example, in the resting state of the MEMS, the mass structure may be bent and/or predeflected in the direction of the substrate by stresses in some first regions, which means that in the resting state of the MEMS, the mass structure is a shorter distance from the substrate in these first regions bent in the direction of the substrate than in the remaining regions. According to one specific embodiment of the present invention, it is conceivable for the electrode structure and/or the counter-electrode structure to be shaped thinner or to be partially or completely omitted in these first regions bent in the direction of the substrate. For example, it is conceivable for the first regions bent in the direction of the substrate to correspond to one or more edge regions of the mass structure.

Since, according to one specific embodiment of the present invention, a first shape of the electrode structure and/or a second shape of the counter-electrode structure is formed as a function of the deformation of the mass structure, it is possible for the shapes of the electrode structure and/or the counter-electrode structure to differ (in some instances, considerably) from simple geometric shapes, such as a rectangle or a circle, as a function of the predeflection of the mass structure. Preferably, it is possible for the shapes of the electrode structure and/or the counter-electrode structure to follow the predeflection of the movable mass structure in such a manner, that in the case of impingement, a distance between the electrode structure and the counter-electrode structure (in the vertical direction) does not fall below a defined minimum distance.

Since according to one specific embodiment of the present invention, the first shape of the electrode structure and/or the second shape of the counter-electrode structure is formed with the aid of a plurality of angular, in particular, rectangular, subsections, it is advantageously possible for the electrode structure and/or the counter-electrode structure to be formed as a function of the deformation of the mass structure; the desired shapes being able to be approximated, however, by a plurality of angular subsections. This may allow particularly advantageous adaptation to different boundary conditions in the manufacturing operation (e.g., etching access holes).

Since according to one specific embodiment of the present invention, the electrode structure and/or the counter-electrode structure are formed as a function of the deformation of the mass structure in such a manner, that in a state of maximum deflection of the mass structure, in particular, in the case of impingement contact between the mass structure and the substrate, a distance between the electrode structure and the counter-electrode structure does not fall below a definable minimum distance, it is possible for the geometries and/or shapes of the electrode structure and/or counter-electrode structure to be selected in such a manner, that even the in the case of contact of the mass structure with the substrate, the electrical forces of attraction between the electrode structure and the counter-electrode structure in response to an applied electrical voltage do not become overly high (in particular, remain below a threshold value), so that the tendency to stick may be reduced.

Since, according to one specific embodiment of the present invention, the mass structure and/or the substrate includes a limit-stop structure, where in the state of maximum deflection of the mass structure, the limit stop between the mass structure and the substrate is formed with the aid of the limit-stop structure, it is possible to form a defined contact point and/or region between the mass structure and the substrate, which means that the maximum deflection of the mass structure from its position of rest may be limited. The first shape of the electrode structure and/or the second shape of the counter-electrode structure preferably follow the predeflection/deformation of the mass structure in such a manner, that in the event of contact between the mass structure and the substrate, formed via the limit-stop structure, a distance between the electrode structure and the counter-electrode structure does not fall below a minimum distance. This minimum distance is preferably greater than the minimum distance between the electrode structure and the counter-electrode structure would be, if the electrode structure and the counter-electrodes had been formed irrespectively of the deformation of the mass structure and, consequently, independently of the deformation of the mass structure.

Since according to a specific embodiment of the present invention, the mass structure exhibits deformation in such a manner, that, in the state of maximum deflection of the mass structure and/or in the resting state of the micromechanical system, the mass structure is a shorter distance from the substrate in a first region than in a second region, where the electrode structure and/or the counter-electrode structure are formed as a function of the deformation of the mass structure in such a manner, that in the first region, the electrode structure includes a recess, and/or that in the vertical direction, the electrode structure has a lower thickness in the first region than in the second region, and/or that in the first region, the counter-electrode structure includes a recess, and/or that in the vertical direction, the counter-electrode structure has a lower thickness in the first region than in the second region, it is particularly advantageously possible to reduce the risk of the mass structure sticking. In order to prevent a distance between the electrode structure and the counter-electrode structure from falling below a minimum distance in the case of impingement of the mass structure on the substrate, according to a specific embodiment of the present invention, the electrode structure and/or the counter-electrode structure are formed in such a manner, that the electrode structure and/or the counter-electrode structure have a lower thickness in the one or more first regions than in other regions, and/or that the electrode structure and/or counter-electrode structure have recesses or cutouts in the one or more first regions, so that in spite of the deformation of the mass structure, the definable (desired) distance between the electrode structure and the counter-electrode structure is maintained and does not fall below a minimum distance.

The recesses may be understood to mean that in the region of their respective recess(es), the electrode structure and/or the counter-electrode structure are completely omitted and/or removed, or that in the region of their respective recess (es), the electrode structure and/or the counter-electrode structure are formed to be at least thinner than in other regions.

Since according to a specific embodiment of the present invention, the microelectromechanical system takes the form of an acceleration sensor having at least one axis of detection parallel to the vertical direction, where the mass structure takes the form of a rocker-arm structure and is joined to the substrate with the aid of one or more torsion springs, it is possible for the mass structure to be able to execute rocker-arm motion in the vertical direction. Consequently, the tendency of a rocker-type acceleration sensor to stick may be reduced in an advantageous manner.

Further subject matter of the present invention includes a method for manufacturing a microelectromechanical system according to a specific embodiment of the present invention, where the electrode structure and/or the counter-electrode structure are formed as a function of the deformation of the mass structure.

In this context, the deformation of the mass structure (in the finished sensor) is preferably already known and/or may be approximated during the manufacture of the MEMS. This knowledge about the later deformation in the finished sensor may be acquired, for example, from further MEMS formed at least substantially identically and already finished, using their measurements and/or characterization, and/or obtained by simulations. Thus, during the manufacture of the microelectromechanical system, the shape of the electrode structure and/or the shape of the counter-electrode structure may already be adapted advantageously to the later deformation of the mass structure of the finished sensor in its resting state, and the electrode structure and/or the counter-electrode structure may be formed as a function of this later deformation.

Since according to a specific embodiment of the present invention, the first electrode structure is formed as a function of the deformation of the mass structure with the aid of an etching step, in particular, with the aid of a sacrificial layer etching process, where the limit-stop structure of the mass structure is preferably formed during the etching step, as well, it is possible to provide a particularly efficient manufacturing operation. Consequently, costs may be reduced. The limit-stop structure and the electrode structure may preferably be formed in the same layer and/or with the aid of the same layer, of the MEMS.

In this context, the advantages and refinements, which have already been described in connection with the microelectromechanical system of the present invention or in connection with a specific embodiment of the microelectromechanical system of the present invention, may be used for the method of manufacturing a microelectromechanical system.

Exemplary embodiments of the present invention are illustrated in the figures and explained in greater detail in the description below.

DETAILED DESCRIPTION OF EXAMPLE EMBODIMENTS

In the various figures, identical parts are always denoted by the same reference symbols, and therefore, generally, they are named or mentioned only once.

Figure 1:
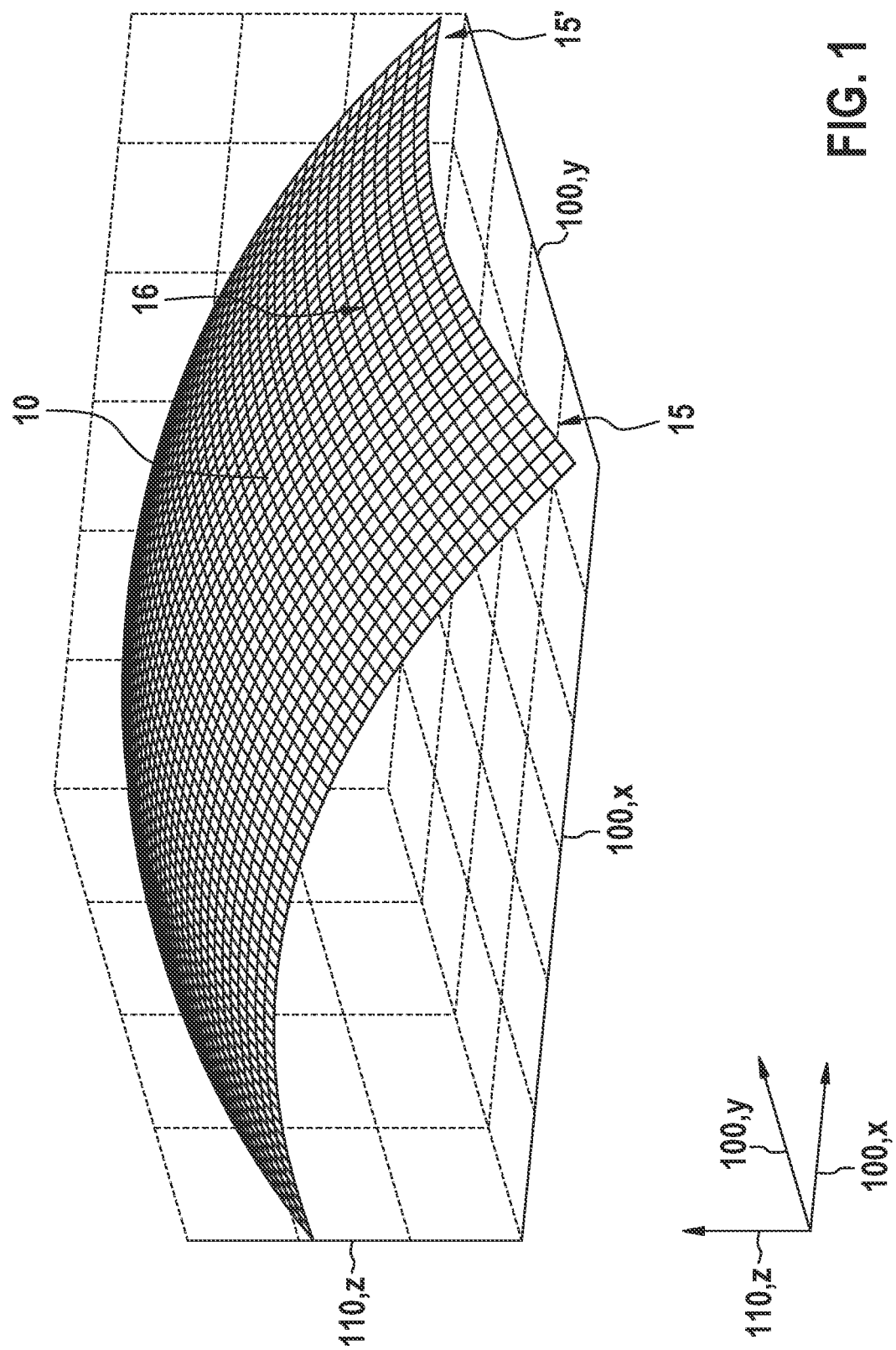
FIG. 1 shows a schematic representation of the deformation of a mass structure according to a first exemplary embodiment of the present invention.

A schematic representation of the deformation of a mass structure 10 in a resting state, according to a first exemplary embodiment of the present invention, is shown in FIG. 1. The mass structure is formed to be movable relative to a substrate 20 in vertical direction 110 (parallelly to the z-axis), perpendicularly to a major plane of extension 100 of substrate 20. Major plane of extension 100 of substrate 20 (not shown) may also be understood as the substrate plane and is oriented parallelly to the x-axis and y-axis. In its resting state, mass structure 10 is not oriented completely parallelly to major plane of extension 100 of substrate 20, but is locally bent in perpendicular direction 110. In particular, in first region 15 and further first region 15', mass structure 10 is deflected particularly far in the direction of substrate 20, which is situated underneath mass structure 10. Therefore, the distance between mass structure 10 and substrate 20 is shorter in these first regions 15, 15' than in a second region 16. The deformation and/or predeflection of mass structure 10 may be caused, in particular, by mechanical stress, which results, for example, from the process temperatures or other parameters during the manufacture of MEMS 1. Mass structure 10 belongs, for example, to an acceleration sensor having at least one axis of detection parallel to vertical direction 110. In this context, mass structure 10 may take the form of a rocker-arm structure and may be joined to substrate 20 with the aid of one or more torsion springs (not shown).

Figure 2:
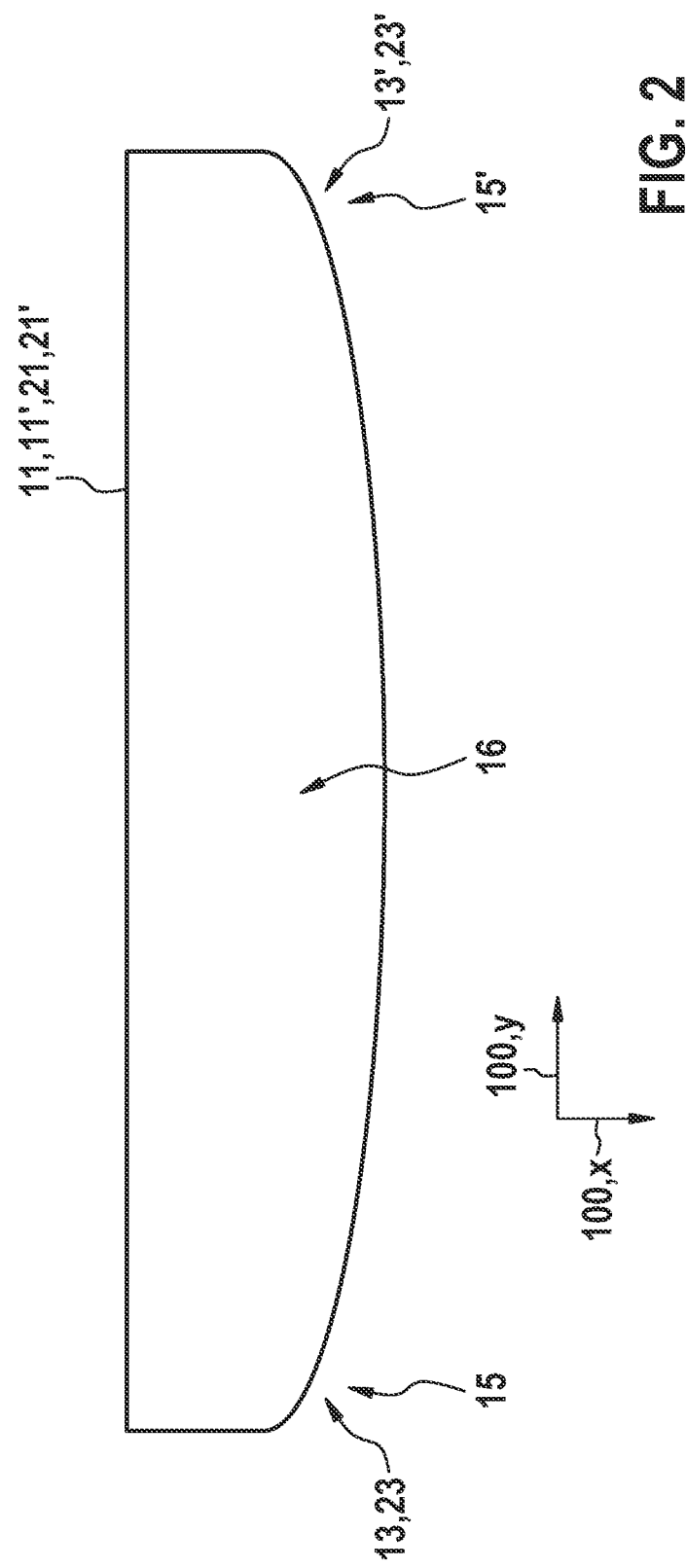
FIG. 2 shows a schematic representation of an electrode structure and/or counter-electrode structure according to the first exemplary embodiment of the present invention.

In FIG. 2, a schematic representation of an electrode structure 11 and/or a counter-electrode structure 21 according to the first exemplary embodiment of the present invention is shown in a plan view onto major plane of extension 100 of substrate 20. The electrode shown may be both an electrode structure 11 of mass structure 10 and a counter-electrode structure 21 of substrate 20. First shape 11' or geometric form of electrode structure 11 and/or second shape 21' or geometric form of counter-electrode structure 21 is selected as a function of the deformation and/or predeflection of mass structure 10 shown in FIG. 1. In particular, electrode structure 11 and/or counter-electrode structure 21 includes recesses 13, 13' and/or recesses 23, 23' in first region 15 and further first region 15', in which the distance between mass structure 10 and substrate 20 is particularly short due to the predeflection of mass structure 10 in the resting state. Consequently, electrode structure 11 and/or counter-electrode structure 21 is not present in these first regions 15, 15'. However, electrode structure 11 and/or counter-electrode structure 21 is formed in the second region 16, in which in the resting state, the distance between mass structure 10 and substrate 20 is greater than in first regions 15, 15'. Thus, on the whole, electrode structure 11 and/or counter-electrode structure 21 may be formed as a function of the deformation of mass structure 10 in such a manner, that in a state of maximum deflection of mass structure 10 in the case of impingement contact between mass structure 10 and substrate 20, a distance between electrode structure 11 and counter-electrode structure 21 does not fall below a definable minimum distance.

Alternatively, it would also be possible for at least part of electrode structure 11 and/or counter-electrode structure 21 to be present, but made thinner, in first regions 15', 15" than in second region 16.

In first regions 15, 15', mass structure 10 and/or substrate 20 may preferably include a limit-stop structure 12, by which a selected contact region between mass structure 10 and substrate 20 is formed. This is particularly advantageous, since due to the predeflection of mass structure 10 relative to substrate 20 in the resting state, the distance between mass structure 10 and the substrate is already less in first regions 15, 15' than in the remaining regions (that is, in second region 16).

Figure 3:
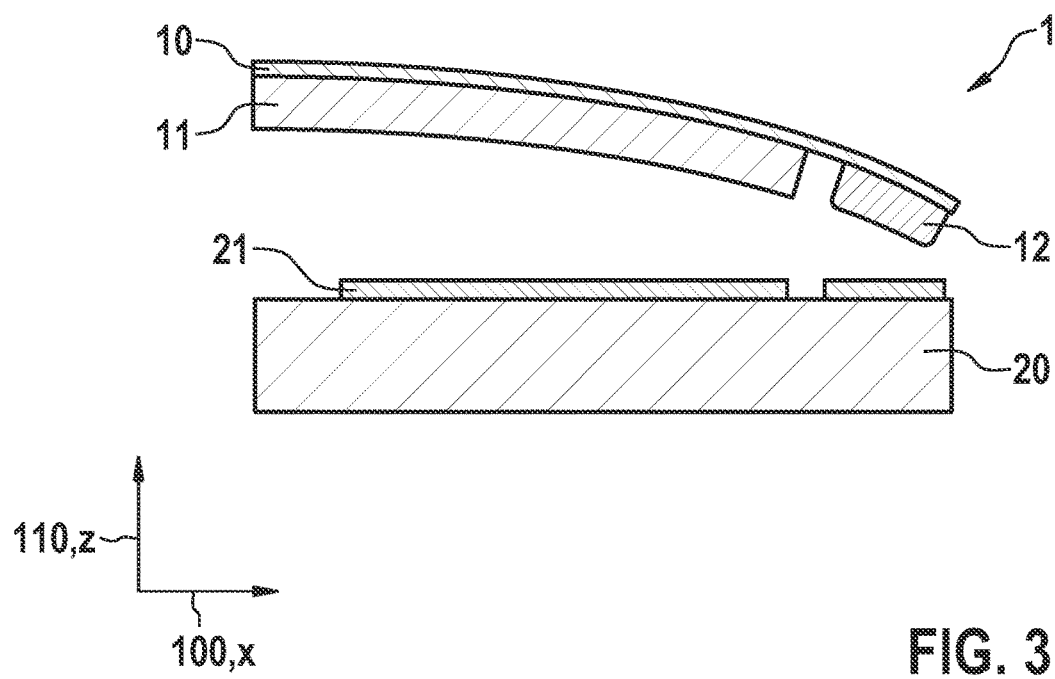
FIG. 3 shows a schematic cross-sectional view of a microelectromechanical system according to the related art.

FIG. 3 shows a schematic cross-sectional view of a microelectromechanical system 1 according to the related art. Mass structure 10 includes a limit-stop structure 12 in the form of a limit-stop nub. Electrode structure 11 and counter-electrode structure 21 are each constructed to have a constant thickness over their entire extent and are also present in first regions 15, 15', in which mass structure 10 is bent particularly far in the direction of substrate 20 in the resting state. Therefore, electrode structure 11 and counter-electrode structure 21 are each not formed as a function of the deformation of mass structure 10 in the resting state induced by mechanical stress.

Figure 4:
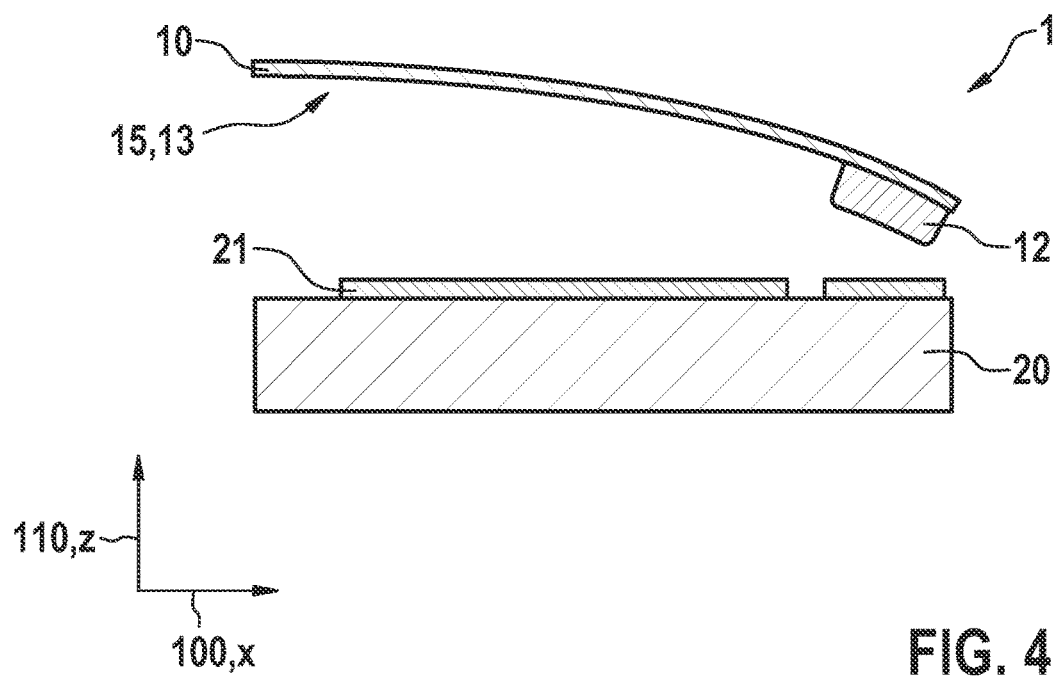
FIG. 4 shows a schematic cross-sectional view of a microelectromechanical system according to a specific embodiment of the present invention.

A schematic cross-sectional view of a microelectromechanical system 1 according to a specific embodiment of the present invention is shown in FIG. 4. The cross section shown may be produced, for example, for first shape 11' of electrode structure 11 according to the first exemplary embodiment of FIG. 2. On the bottom side of mass structure 10, electrode structure 11 is not present and/or has been removed, in first region 15. Consequently, mass structure 10 includes a recess 13 for electrode structure 11 on its lower side. Thus, the minimum distance between electrode structure 11 and counter-electrode structure 21, which is situated on the upper side of substrate 20, is increased in comparison with FIG. 3. If, in response to deflection of movable mass structure 10, contact between substrate 20 and mass structure 10 is made by the limit-stop nub of limit-stop structure 12, then consequently, a distance between electrode structure 11 and counter-electrode structure 21 may advantageously be prevented from falling below a defined minimum distance. This reduces the tendency to stick.

Figure 5:
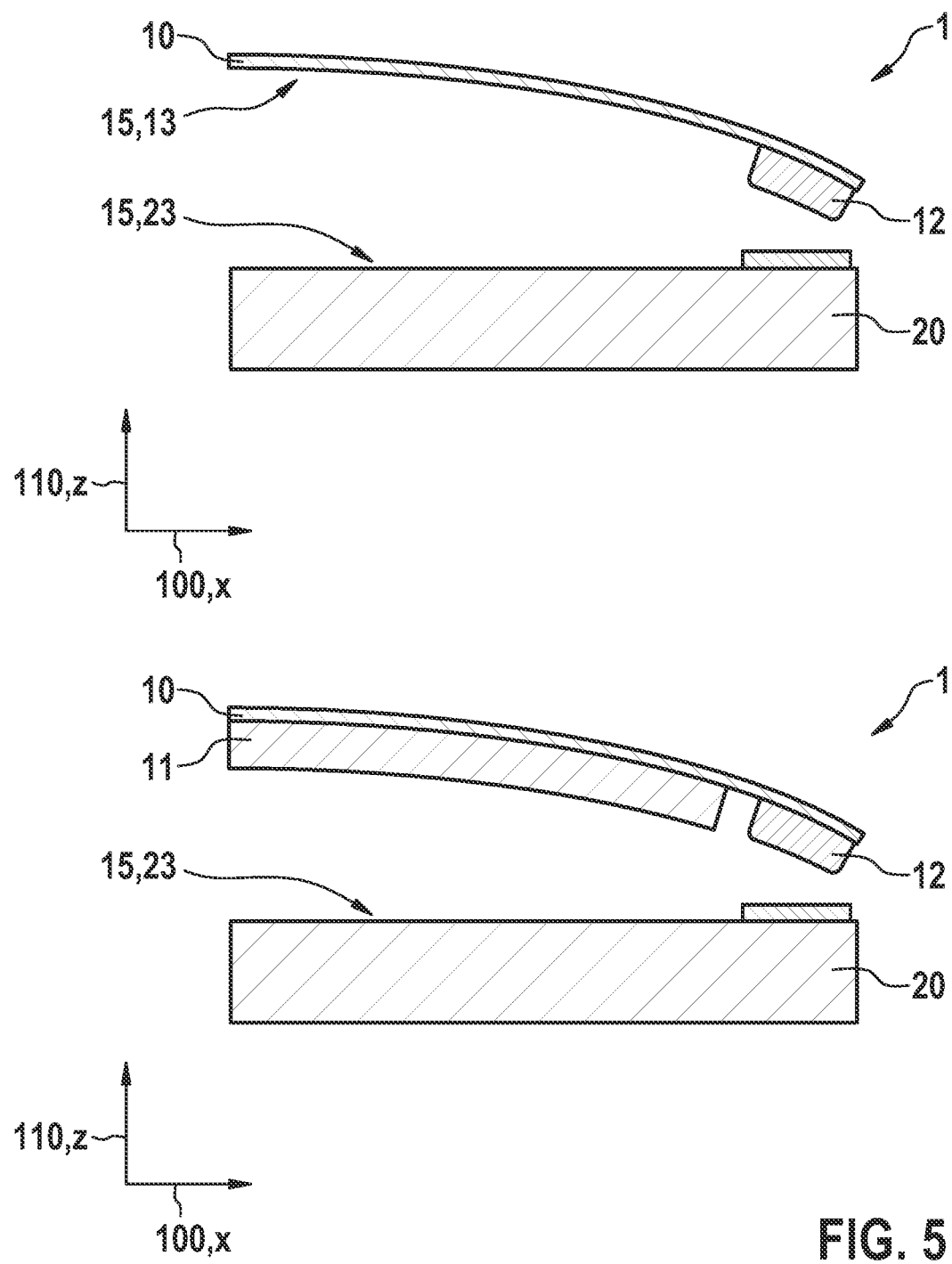
FIG. 5 shows schematic cross-sectional views of a microelectromechanical system according to specific embodiments of the present invention.

Schematic cross-sectional views of a microelectromechanical system 1 according to specific embodiments of the present invention are shown in FIG. 5. In the upper part of FIG. 5, a specific embodiment is shown, in which in addition to the fact that electrode structure 11 on the lower side of mass structure 10 has been removed in first region 15, 15', counter-electrode structure 21 has further been removed in the first region 15, 15', as well, so that a recess 23, 23' of counter-electrode structure 21 is formed in first region 15, 15'. Consequently, the distance between substrate 20 and mass structure 10 in critical, first region 15, 15' is additionally increased. Thus, both first shape 11' of electrode structure 11 and second shape 21' of counter-electrode structure 21 are formed as a function of the deformation of mass structure 10 and/or adapted in accordance with the deformation of mass structure 10.

A specific embodiment, in which electrode structure 11 on the lower side of mass structure 10 is not removed or thinned in first region 15, 15', is shown in the bottom part of FIG. 5. Instead, counter-electrode structure 21 is removed in first region 15, 15', which means that a recess 23, 23' of counter-electrode structure 20 is formed in first region 15, 15'. Accordingly, second shape 21' of counter-electrode structure 21 is formed as a function of the deformation of mass structure 10 and/or adapted in accordance with the deformation of mass structure 10.

Figure 6:
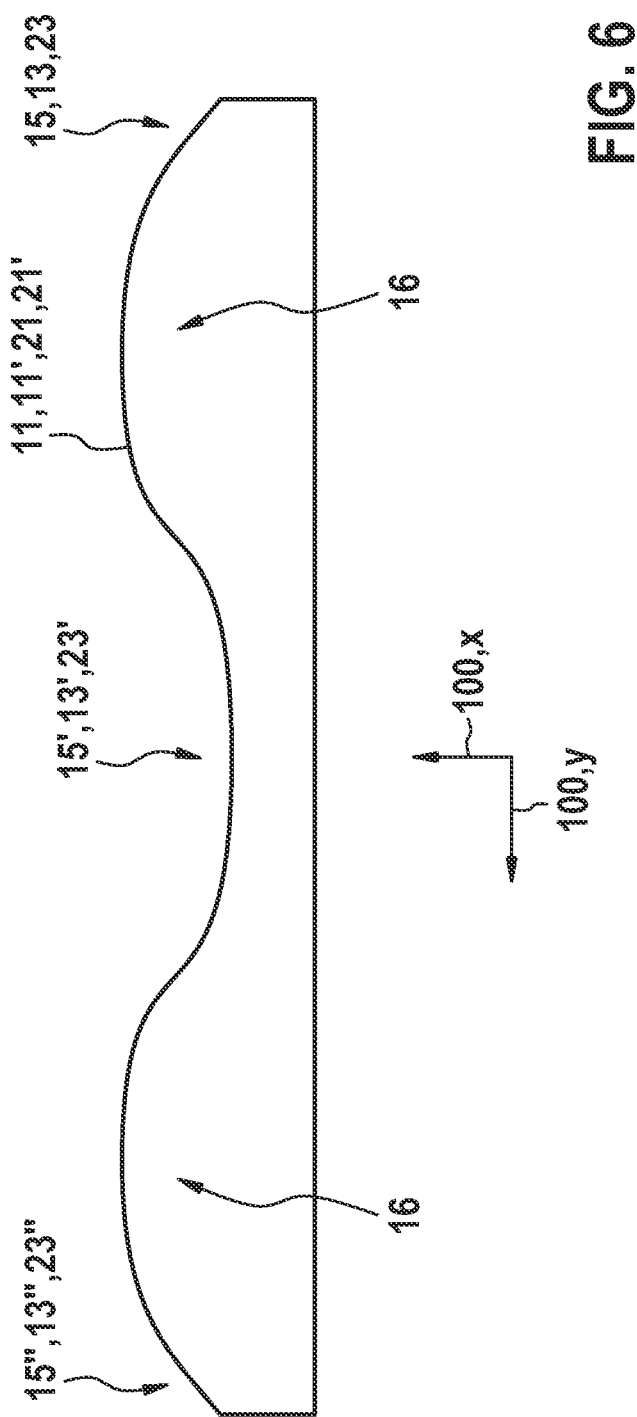
FIG. 6 shows a schematic representation of an electrode structure and/or counter-electrode structure according to a second exemplary embodiment of the present invention.

Shapes other than shapes 11', 21' shown in FIG. 2 are also conceivable for electrode structure 11 and/or counter-electrode structure 21 as a function of the deformation of the movable or fixed structures, in particular, since the form and/or shape 11', 21' of electrode structure 11 and/or of counter-electrode structure 21 is selected as a function of the instances of deformation. A schematic representation of an electrode structure 11 and/or a counter-electrode structure 21 according to a second exemplary embodiment of the present invention, in a plan view onto major plane of extension 100 of substrate 20, is shown in FIG. 6. The electrode shown may be both an electrode structure 11 of mass structure 10 and a counter-electrode structure 21 of substrate 20. In particular, electrode structure 11 includes recesses 13, 13', 13" in first region 15 and further first regions 15', 15", in which a distance between mass structure 10 and substrate 20 is shorter than in second region 16 due to the predeflection of mass structure 10 in the resting state. Alternatively, or in addition, counter-electrode structure 21 includes recesses 23, 23', 23" in first region 15 and further first region 15', 15". Consequently, electrode structure 11 and/or counter-electrode structure 21 is not present in first regions 15, 15', 15". In this case, recesses 13, 13', 13" and/or recesses 23, 23', 23" are situated in an edge region of mass structure 10 in the y-direction (parallel to an axis of rotation of the rocker arm), so that, in particular, a wavelike contour is produced in the y-direction. In this context, electrode structure 11 and/or counter-electrode structure 21 are formed as a function of the deformation of mass structure 10, so that in a state of maximum deflection of mass structure 10, a distance between electrode structure 11 and counter-electrode structure 21 does not fall below a definable minimum distance.

Figure 7:
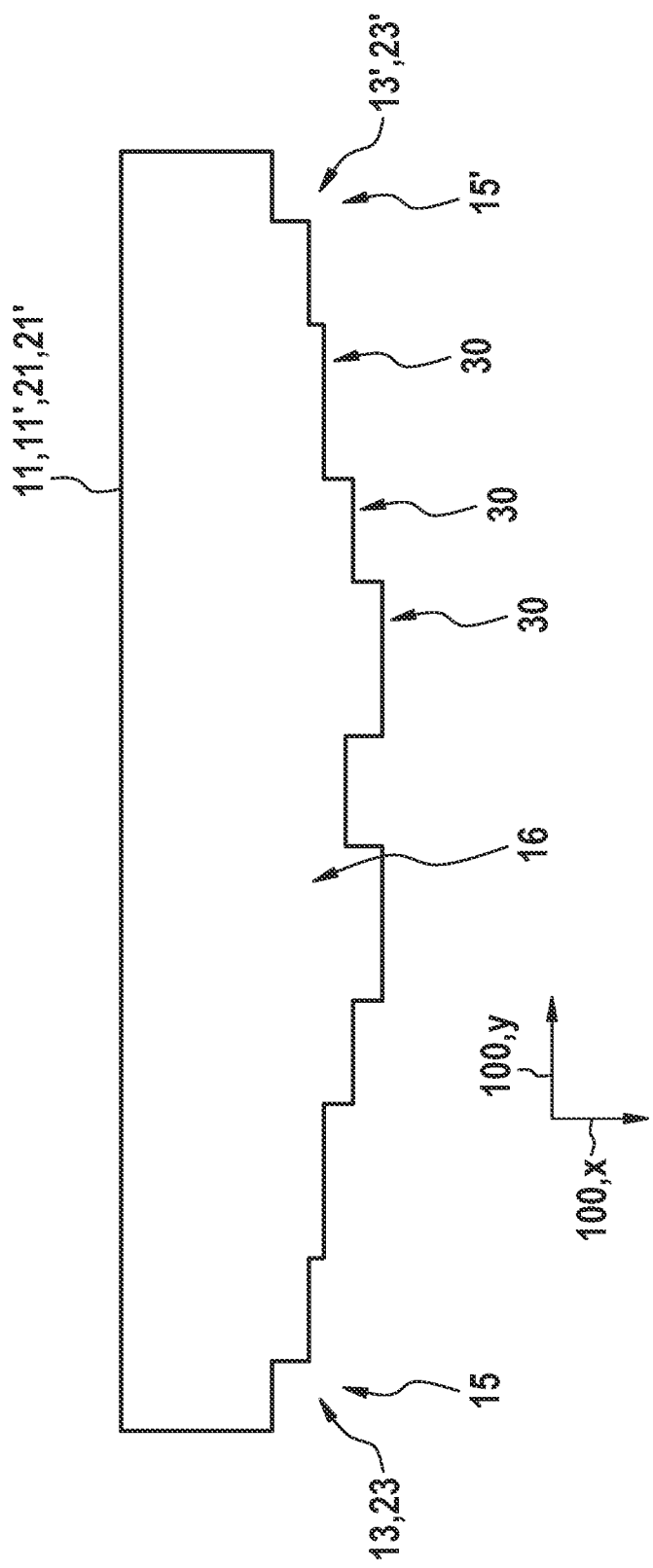
FIG. 7 shows a schematic representation of an electrode structure and/or counter-electrode structure according to a third exemplary embodiment of the present invention.

A schematic representation of an electrode structure 11 and/or counter-electrode structure 21 according to a third exemplary embodiment of the present invention is shown in a plan view in FIG. 7. Since in some instances, further boundary conditions (for example, etching access holes) must be fulfilled in the design and manufacture of shape 11', 21' of electrode structure 11 and/or counter-electrode structure 21, it is advantageously conceivable for the shapes of electrode structure 11 and/or counter-electrode structure 21 (for example, the shape according to FIG. 2 or FIG. 6) to be approximated by rectangular subsections 30, as represented in FIG. 7.

What is claimed is:

1. A microelectromechanical system, comprising:
a substrate having a major plane of extension;
a mass structure formed to be movable relative to the substrate in a vertical direction, perpendicularly to the major plane of extension, the mass structure including an electrode structure;
wherein the substrate includes a counter-electrode structure, the electrode structure and the counter-electrode structure being coupled capacitively, and wherein the mass structure has a deformation in a resting state of the microelectromechanical system, the electrode structure and/or the counter-electrode structure being formed as a function of the deformation already present in the resting state of the mass structure,
wherein the mass structure is formed with the deformation in such a manner, that in a state of maximum deflection of the mass structure and/or in the resting state of the microelectromechanical system, the mass structure is a shorter distance from the substrate in a first region than in a second region, the electrode structure and/or the counter-electrode structure being formed as a function of the deformation of the mass structure in such a manner that:
the electrode structure has a recess in the first region, and/or in the vertical direction, the electrode structure has a lower thickness in the first region than in the second region, and/or
the counter-electrode structure has a recess in the first region, and/or in the vertical direction, the counter-electrode structure has a lower thickness in the first region than in the second region.

2. The microelectromechanical system as recited in claim 1, wherein
the deformation of the mass structure includes a locally varying predeflection of the mass structure relative to the substrate in the resting state of the microelectromechanical system, and/or
the deformation of the mass structure includes a deviation of a shape of the mass structure from a shape of the mass structure strived for during the manufacture of the microelectromechanical system, and/or
the deformation of the mass structure is caused by mechanical stresses, the mechanical stresses being caused by the manufacturing of the microelectromechanical system.

3. The microelectromechanical system as recited in claim 1, wherein a first shape of the electrode structure and/or a second shape of the counter-electrode structure is formed as a function of the deformation of the mass structure.

4. The microelectromechanical system as recited in claim 3, wherein the first shape of the electrode structure and/or the second shape of the counter-electrode structure is formed with the aid of a plurality of angular rectangular subsections.

5. The microelectromechanical system as recited in claim 1, wherein the electrode structure and/or the counter-electrode structure are formed as a function of the deformation of the mass structure in such a manner, that in a state of maximum deflection of the mass structure, in the case of impingement contact between the mass structure and the substrate, a distance between the electrode structure and the counter-electrode structure does not fall below a definable minimum distance.

6. The microelectromechanical system as recited in claim 5, wherein the mass structure and/or the substrate includes a limit-stop structure, in a state of maximum deflection of the mass structure, the impingement contact between the mass structure and the substrate being formed using the limit-stop structure.

7. The microelectromechanical system as recited in claim 1, wherein the microelectromechanical system is an acceleration sensor having at least one axis of detection parallel to the vertical direction, and the mass structure is a rocker-arm structure and is joined to the substrate using one or more torsion springs.

\* \* \* \* \*